United States Patent [19]

Dietl et al.

[11] 4,308,245

[45] Dec. 29, 1981

[54] METHOD OF PURIFYING METALLURGICAL-GRADE SILICON

[75] Inventors: Josef Dietl, Neuötting; Claus Holm, Baldham, both of Fed. Rep. of Germany

[73] Assignee: Heliotronic Forschungs- und Entwicklungsgesellschaft fur Solarzellen-Grundstoffe mbH, Burghausen, Fed. Rep. of Germany

[21] Appl. No.: 196,496

[22] Filed: Oct. 14, 1980

[30] Foreign Application Priority Data

Nov. 8, 1979 [DE] Fed. Rep. of Germany ....... 2945072

[51] Int. Cl.$^3$ ............................................. C01B 33/02
[52] U.S. Cl. .................................................... 423/348
[58] Field of Search ............. 423/348, 350; 23/295 R, 23/297

[56] References Cited

U.S. PATENT DOCUMENTS

| | | | |
|---|---|---|---|
| 3,069,240 | 12/1962 | Armand | 423/348 |
| 3,097,068 | 7/1963 | Lutz et al. | 423/348 |
| 4,195,067 | 3/1980 | Kotnal | 423/348 |

FOREIGN PATENT DOCUMENTS 200106 10/1958 Austria ................................ 423/348

*Primary Examiner*—G. O. Peters
*Attorney, Agent, or Firm*—Allison C. Collard; Thomas M. Galgano

[57] ABSTRACT

A method of purifying metallurgical-grade silicon for the production of silicon solar cells is provided, in which metallurgical-grade silicon is dissolved in aluminum and brought into contact with an aluminum sulphide extraction melt. Thereafter, the silicon is crystallized out and separated off by cooling the melt to a minimum temperature of 600° C. The aluminum melt remaining can then be recharged with silicon, heated, brought into contact with the extraction melt, so that additional silicon can be crystallized out.

7 Claims, No Drawings

METHOD OF PURIFYING METALLURGICAL-GRADE SILICON

The invention relates to a method of purifying metallurgical-grade silicon by dissolution in aluminum and treatment with an extraction melt.

The invention is to be viewed primarily in the context of the generation of energy by means of silicon solar cells. In order for the supply of electrical energy by such solar cells to be economically competitive, the base material, silicon, must be relatively inexpensively available. Silicon, which occurs in the earth in the form of silica in practically inexhaustible quantities, must, however, first be reduced and purified. Gas-phase purification of metallurgical-grade silicon, such as is normally used in the production of high-grade electronic components, is excluded since it is far too expensive. Such stringent requirements are not, however, imposed on the purity of solar-cell silicon, and therefore cheaper purification methods can be used.

European patent application No. 2,135 describes a method of purifying metallurgical-grade silicon in which silicon is introduced into a metallic melt, crystallized from that melt, treated with an extraction melt, and finally further purified by being drawn from the melt with the impurities remaining in the melt. The introductory portion of this patent application also mentions numerous other literature references that deal with the inexpensive purification of silicon.

Finally, German Offenlegungsschrift No. 27 29 464 describes a method of purifying silicon, in which, prior to the chemical purification step known per se, the silicon is melted and then solidified again by slow cooling; it being possible, if required, to bring the silicon melt into contact with an extraction melt as well.

The object of the present invention is to provide a method of purifying metallurgical-grade silicon, based on the cited prior art, which method is at least as effective as, but simpler and cheaper than, the known procedures.

According to the invention, this object is achieved in that the silicon to be purified is initially dissolved in aluminum. This mixed melt is then brought into contact with an aluminum sulphide melt, and silicon is thereafter crystallized out and separated by slow cooling of the mixed melt to a minimum temperature of 600° C.

In the method of the invention, metallurgical-grade silicon is used, which has a silicon content of more than 95% by weight, preferably more than 98% by weight, and the material is preferably used in ground or granulated form.

The metallurgical-grade silicon is either melted together with the minimum quantity of aluminum necessary for dissolution at the proposed extraction temperature, based on the phase diagram (see Hansen, "Constitution of Binary Alloys", 2nd Edition, McGraw Hill Book Company Inc., New York 1958, page 133), or it is introduced into already molten aluminum. The latter procedure is used in particular when the method is to be carried out on a semicontinuous or fully continuous basis wherein molten aluminum, which has been separated off after purified silicon has crystallized out and which still contains dissolved metallurgical-grade silicon, is returned to the extraction vessel together with a further charge of silicon.

At the beginning of the first extraction cycle, aluminum sulphide, per se or in the form of aluminum and sulphur, is expediently brought into the extraction crucible, which may, for example, be of carbon, and the material is heated to a temperature above its melting point of 1100° C.

At temperatures above 1100° C., silicon reacts to an appreciable extent with the sulphide slag to form volatile silicon sulphide, which evaporates from the system and becomes deposited in cooler areas. Therefore, it is advantageous to reduce the melting point of the aluminum sulphide extraction slag, by means of suitable additives, to such an extent that extraction of the aluminum-silicon mixed melt becomes possible at a lower temperature of, preferably, approximately 1000 to 1050° C.

The melting point of the slag can be reduced, for example, by means of suitable sulphide or halide additives, particularly fluorides and sulphides of the alkali metals and alkaline earth metals. An addition of aluminum oxide has proved particularly advantageous, especially in quantities of approximately 20 to 40% by weight, based on the resulting aluminum sulphide extraction melt.

The quantity of aluminum and the quantity of the charge of metallurgical-grade silicon are expediently so related to each other that, although the silicon is completely dissolved, the resulting aluminum melt is at least substantially saturated with silicon at the extraction temperature, since excess aluminum brings no advantage but merely increases the costs involved.

As regards the ratio of the weight of the aluminum-silicon mixed melt to that of the aluminum sulphide extraction melt during extraction, values of between 1:0.5 to 1:1.5 have proved particularly advantageous, although other weight ratios can be used. Even with a weight ratio of 1:0.1, a good purifying effect is achieved over longer extraction periods, and the same is true in the case of weight ratios involving a higher proportion of aluminum sulphide extraction melt than one corresponding to the mean ratio of 1:1.5 indicated above, though in this case the purifying effect is neither improved nor accelerated since the settling times following thorough mixing are extended. In the last-mentioned case as well, costs would of course be increased since larger quantities of melt would have to be maintained at the desired temperature.

In order to reduce the extraction times, it is recommended that the contact faces between the two melts be increased by suitable thorough mixing. In the preferred embodiment, this is achieved by stirring, and the effect can be intensified if the stirrer is intermittently vertically displaced and its direction of rotation is alternately reversed. Suitable for this purpose are, for example, winged stirrers, which, because of their construction, provide an action similar to that of a ship's propeller, and which are expediently vertically displaceable. Carbon, and particularly graphite, is a very suitable material for such stirrers.

Following the introduction and the melting of the aluminum containing metallurgical-grade silicon and of the aluminum sulphide extraction melt, stirring is carried out for about 1 to 3 hours, preferably under a protective gas, the duration of course being dependent upon the intensity of the stirring action, as well as upon the dimensions of the stirrer and the extraction vessel. Nitrogen and argon, for example, are suitable protective gases. The stirring phase is followed by a so-called killing phase, likewise lasting approximately 1 to 3 hours on average, during which the stirrer is stopped, and optionally moved upward out of the slag, so that the aluminum droplets containing dissolved silicon sink from the extraction melt into the metal pool.

The two melts are then separated, and the temperature of the aluminum-silicon mixed melt slowly falls, preferably at a rate of approximately from 0.5° to 3° C. per minute, to a minimum of approximately 600° C. (temperature of the eutectic: 577° C.), and preferably to approximately 650° to 700° C.

Then, the mixture is transferred from the crucible in which it has cooled to a heatable centrifuge for the purpose of separating off the silicon lamellae that have crystallized out, and the molten aluminum is flung or spun off in this centrifuge. The centrifuge basket, as well as the crucible used for crystallizing out the silicon, may be of a ceramic material or carbon, and the basket may also be of steel. A further possible way of separating the mixture consists of filtering off the silicon lamellae, that have crystallized out, using quartz wool, for example. The silicon lamellae, separated off by one or the other method, are purified, after cooling, by washing with dilute aqueous hydrochloric acid or alcohol, so as to remove residual aluminum, and in the last-mentioned method, when ethanol is used, commercial aluminum ethoxide is obtained as a reaction product. To separate off further occluded aluminum, it is recommended that the silicon lamellae be comminuted to a size of approximately 50 μm and again be washed with dilute hydrochloric acid or alcohol, and in this way, the aluminum content can be reduced to approximately from 400 to 600 ppm by weight, roughly corresponding to the maximum solubility of the aluminum in silicon at the precipitation temperature. An aluminum level of this kind in silicon can be tolerated as the basic doping in some polycrystalline types of solar cell, whereas in other cases, the aluminum content can be further reduced by known methods such as slag treatment, segregation by directional solidification or evaporation in vacuo; these methods being used singly or in combination. If, for example, use is made of slag treatment in which the silicon is introduced into an extraction melt consisting of, for example, alkaline earth metal silicates and/or alkaline earth metal fluorides, it is possible to dispense with the prior washing treatment with hydrochloric acid or alcohol.

The separated aluminum, depending upon the temperature to which it has been cooled for crystallizing out the silicon, still has a residual silicon content of the order of 15 to 20 atom %, which, however, is not lost since it is then returned to the extraction vessel to receive a fresh charge of metallurgical-grade silicon and is therefore expediently heated to approximately 1000° to 1050° C. Losses of aluminum occurring during the purification are periodically replenished by adding fresh aluminum.

The impurities from the metallurgical-grade silicon are converted, by the extraction melt, mainly into sulphide compounds, which remain in solution in the slag or evaporate out of the system. If the extraction melt has become too heavily enriched with impurities, the slag is disposed of and replaced by fresh aluminum sulphide with appropriate additions of aluminum oxide.

In the following example, the process of the present invention will be more fully described, and is given by way of illustration and not of limitation.

EXAMPLE

The reaction vessel used was a carbon crucible having a cover provided with an opening for a screw-type stirrer made of graphite.

This crucible was charged with 5 kg of metallurgical-grade silicon (purity 98%; particle size 2 to 5 mm) and 5.5 kg of aluminum (purity 99.9%) and its contents were melted and heated to aproximately 1050° C. under a nitrogen atmosphere and by means of a resistance-heating unit within which the crucible was placed. 8 kg of aluminum sulphide powder (purity 99.9% ) were then added together with 2.5 kg of corundum powder (purity 99.9%). After melting of the aluminum sulphide extraction melt, the temperature was still maintained at approximately 1050° C. and was stirred for approximately two hours at a rate of approximately 100 to 200 rev/min, the propeller mixer being periodically vertically displaced and its direction of rotation reversed.

The stirrer was then switched off and moved upward out of the melt. After about a further 1.5 hours, at a substantially constant temperature of about 1050° C., the aluminum-silicon mixed melt was tapped, and cooled to approximately 700° C. over a period of four hours, in another carbon crucible. The silicon lamellae that had crystallized out were then filtered off using a filter of compressed quartz wool and were washed with 20% by weight of aqueous hydrochloric acid. After having been filtered off, the silicon lamellae were comminuted in a tungsten carbide ball mill to a mean particle-size of approximately 50 μm and were again washed with dilute aqueous hydrochloric acid. After further filtering and washing free of acid, approximately 3.9 kg of silicon were obtained, with the following analysis determined by means of an atomic absorption spectometer: less than 600 ppm by weight of aluminum, as well as iron, calcium and copper below the detection limit. Using the colorimetric method, the boron content was found to be 2 ppm by weight, and the phosphorus content 0.2 ppm by weight.

In a second cycle, the molten aluminum, still having a silicon content of approximately 20 atom %, was heated to approximately 1100° C., and 4 kg of silicon as specified above were added. After the silicon had dissolved, the melt was again purified with the aluminum sulphide extraction melt remaining in the extraction crucible, and the rest of the procedure was the same as in the first purification cycle. Approximately 4 kg of silicon of the above analysis were obtained.

Thus, while only one example of the present invention has been shown and described, it will be obvious that many changes and modifications may be made thereunto, without departing from the spirit and scope of the invention.

What is claimed is:

1. A method of purifying metallurgical-grade silicon by dissolution in aluminum and treatment with an extraction melt, comprising the steps of:
    dissolving the silicon to be purified in aluminum to produce a mixed melt;
    bringing said mixed melt into contact with an aluminum sulphide extraction melt; and
    thereafter crystallizing out and separating off the silicon by slowly cooling the mixed melt to a minimum temperature of 600° C.

2. The method according to claim 1, wherein said step of bringing said aluminum-silicon mixed melt into contact with said aluminum sulphide extraction melt is carried out at a temperature of from 1000° to 1050° C.

3. The method according to claim 1 or 2, wherein said aluminum sulphide extraction melt has a content of 20 to 40% by weight of aluminum oxide.

4. The method according to claim 1, wherein said aluminum-silicon mixed melt and the aluminum sulphide extraction melt are present in a weight ratio of 1:0.5 to 1:1.5 during extraction.

5. The method according to claim 1, wherein contact between said aluminum-silicon mixed melt and the aluminum sulphide extraction melt is promoted by stirring the two melts into each other.

6. The method according to claim 1, wherein, for the purpose of crystallizing the silicon out, the aluminum-silicon mixed melt is cooled at a rate of from 0.5° to 3° C. per minute.

7. The method according to claim 6, wherein after separation of the silicon that has crystallized out, the aluminum remaining is again heated to 1000° to 1050° C., and after the introduction of a further charge of metallurgical-grade silicon, the mixed melt is again brought into contact with the aluminum sulphide extraction melt.

* * * * *

UNITED STATES PATENT AND TRADEMARK OFFICE
CERTIFICATE OF CORRECTION

PATENT NO. : 4,308,245
DATED : December 29, 1981
INVENTOR(S) : Josef Dietl et al.

It is certified that error appears in the above—identified patent and that said Letters Patent is hereby corrected as shown below:

On the title page, item (75), delete "both" and insert

-- Erhard Sirtl, Marktl/Inn, all --.

Signed and Sealed this

Eleventh Day of May 1982

[SEAL]

Attest:

GERALD J. MOSSINGHOFF

Attesting Officer

Commissioner of Patents and Trademarks